United States Patent [19]
Edwards et al.

[11] Patent Number: 5,301,868
[45] Date of Patent: Apr. 12, 1994

[54] SCRIBE-AND-BREAK TOOL FOR OPTICAL FIBERS

[75] Inventors: Bryan T. Edwards, Camp Hill; David D. Erdman; Soren Grinderslev, both of Hummelstown; Kevin T. Monroe, Harrisburg, all of Pa.

[73] Assignee: The Whitaker Corporation, Wilmington, Del.

[21] Appl. No.: 97,358

[22] Filed: Jul. 26, 1993

[51] Int. Cl.⁵ ............................................. C03B 37/16
[52] U.S. Cl. ................................. 225/96.5; 225/96
[58] Field of Search ............... 225/96, 96.5; 30/272.1, 30/162, 286

[56] References Cited

U.S. PATENT DOCUMENTS

| | | | |
|---|---|---|---|
| 4,202,475 | 5/1980 | Hirai et al. | 225/2 |
| 4,322,025 | 3/1982 | Johnson | 225/96.5 |
| 4,463,886 | 8/1984 | Thornton | 225/96.5 |
| 5,063,672 | 11/1991 | Grois et al. | 30/272.1 |

Primary Examiner—Hien H. Phan
Attorney, Agent, or Firm—Driscoll A. Nina, Jr.

[57] ABSTRACT

A scribe-and-break tool for fracturing the free end of an optical fiber that is especially suitable for hand-holdable configurations and field use which has an elongate body with a plunger that is interrelated to a blade for scribing the free end of an optical fiber retained in tension within a depressible head that extends outward from the body and is depressible inward to bring the free end of the optical fiber into contact with the blade, thereby scribing the free end of the fiber causing the free end to break off.

18 Claims, 4 Drawing Sheets

SCRIBE-AND-BREAK TOOL FOR OPTICAL FIBERS

FIELD OF THE INVENTION

The invention relates to a tool, and more particularly to a tool that may be hand holdable, for scribing and breaking optical fibers.

BACKGROUND OF THE INVENTION

The segments of optical fiber used in fiber optic systems are taken from long lengths of optical fiber. These segments must be cut from the longer lengths and then joined with other fiber optic devices, such as another segment of optical fiber or an electro-optic device. In order to maximize signal transmission across these interfaces, it is necessary that the ends of the segments be free of imperfections.

It is known that by scribing an optical fiber and inducing a tensile stress, the optical fiber will fracture at the scribe point. This leaves a fiber surface that has only slight imperfections, requiring minimal polishing to produce a defect-free surface. The scribe-and-break technique is especially useful for field work because it can be incorporated into a hand tool that produces a clean break at a determinable location without complex machinery. A scribe-and-break tool that will be used in the field must be user-friendly and rugged enough to withstand the inevitable mishandling.

U.S. Pat. No. 4,322,025 discloses a scribe-and-break hand tool having a scribe fixed to a frame opposite an arcuatly shaped fiber supporting surface that is displaceable towards the scribe. The optical fiber is placed on the arcuate surface where it is held in place by spring members. As the arcuate surface is moved towards the scribe, the spring members form the fiber along the arcuate surface, thereby instilling a tensile stress into the optical fiber. The fiber fractures and breaks when the scribe contacts the fiber.

U.S. Pat. No. 5,063,672 discloses another scribe-and-break hand tool that has a scoring probe that is reciprocally moveable within a generally hollow body in response to actuation of a trigger mechanism upon the body. The body itself supports and positions the fiber and the scoring probe moves to contact with the fiber.

SUMMARY OF THE INVENTION

The present invention is a scribe-and-break tool for cutting a free end of an optical fiber. The scribe-and-break tool has a body with a principle axis and a plunger that is mounted to the body and extends along the principle axis. A blade for scribing the free end of the optical fiber is interrelated to the plunger. The free end of the optical fiber is received and supported in a depressible head that is reciprocally movable between an outward position and an inward position. The plunger is slidably engaged within a channel of the depressible head such that as the head moves towards the inward position the blade comes into contact with the free end of the optical fiber, thereby scribing the fiber and a tensile stress induced in the fiber causes the free end of the fiber to break.

The illustrative embodiment of the invention has a hand-holdable body that includes flats for stabilizing the tool when placed on a surface. The depressible head is mounted to the body so that the head may undergo independent reciprocal and rotational movement relative the body. Additionally, the plunger is resiliently mounted to the body by a first resilient member and the portion of the plunger that is received in the channel of the head has a complementary shape therewith to prevent relative rotation but not reciprocation. The depressible head is biased outward from the body by a second resilient member, acting between the plunger and the head, that has a spring force less than, or equal to, that of the first resilient member, whereby the depressible head may be moved inward while the plunger remains in place bringing the free end of the optical fiber into contact with the blade. Any additional inward movement of the depressible head engages the plunger and moves the head and the plunger in conjunction with each other.

It is an object of this invention to provide a tool for scribing and breaking an optical fiber at a precise location.

It is a feature of this invention that the head that receives the free end of the optical fiber is movable towards the blade in order to scribe the free end of the optical fiber and induce the break.

It is an advantage of this invention that the depressible head can be biased outward of the body by a second resilient member so that if the tool is mishandled and dropped the depressible head will absorb any shock and not damage the blade or the part of the head that orientates the free end of the optical fiber relative the blade. It is another advantage of this invention that the depressible head can be attached to the body to permit rotation relative the body, thereby enabling selective orientation of the depressible head, thereby providing convenient access, regardless of the orientation of the body, without affecting the function of the tool. It is yet another advantage of this invention that the plunger may be keyed to the head so that the plunger rotates in conjunction with the head so that the blade remains properly oriented. It is a further advantage of this invention that the body may have flats for stabilizing the tool to prevent it from rolling off a surface. It is a still further advantage of this invention that a lanyard may be attached to the tool for fastening the tool to another object, such as a user's wrist or part of a ladder.

Other objects, features and advantages of the invention will become apparent upon inspection of the following figures and the description of the preferred embodiment.

DESCRIPTION OF THE DRAWINGS

This invention now will be described by way of example with reference to the accompanying drawings in which.

DETAILED DESCRIPTION OF THE PREFERRED EMBODIMENT

Figure 1:
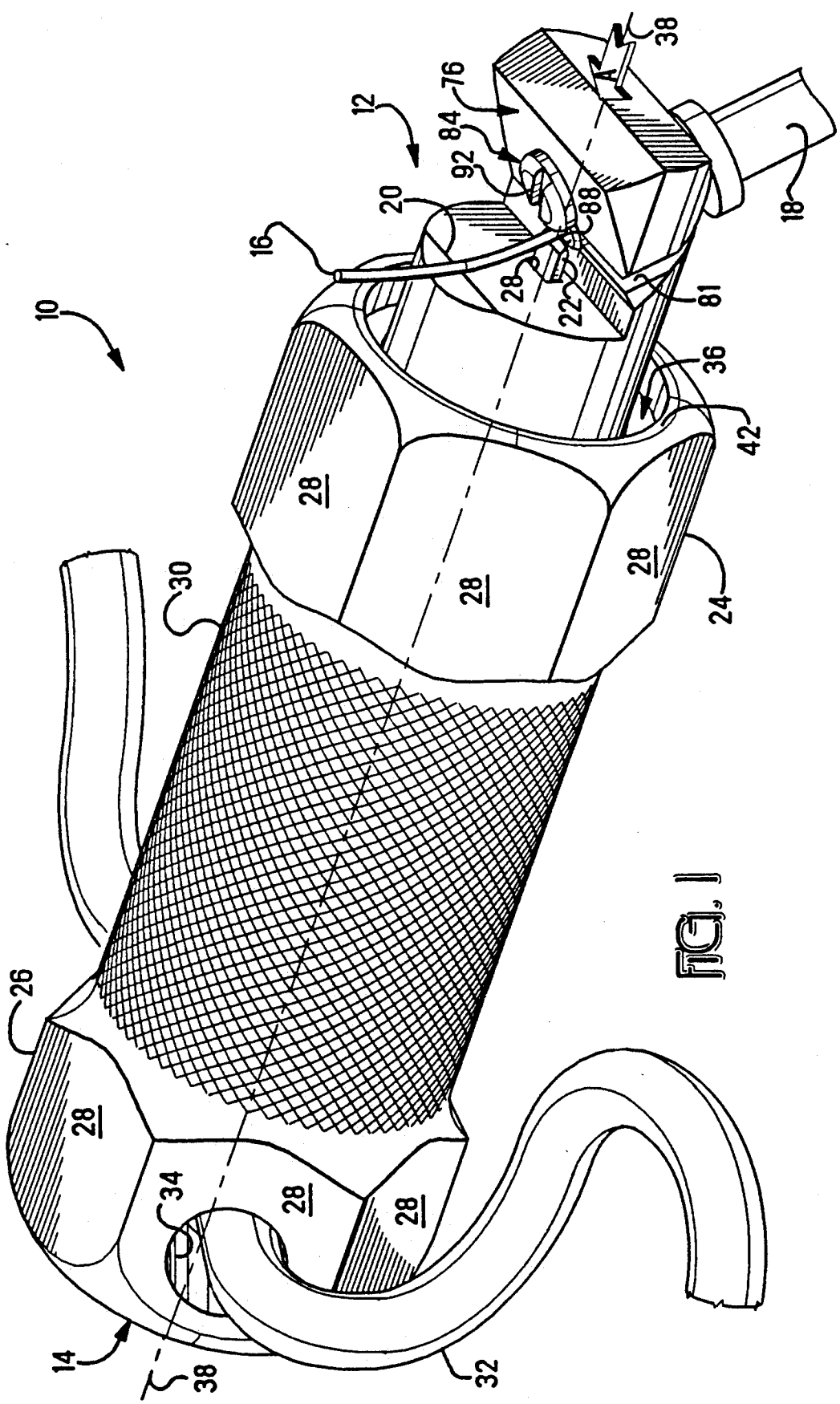
FIG. 1 is a perspective view of a scribe-and-break tool incorporating the concepts of this invention.
Figure 3:
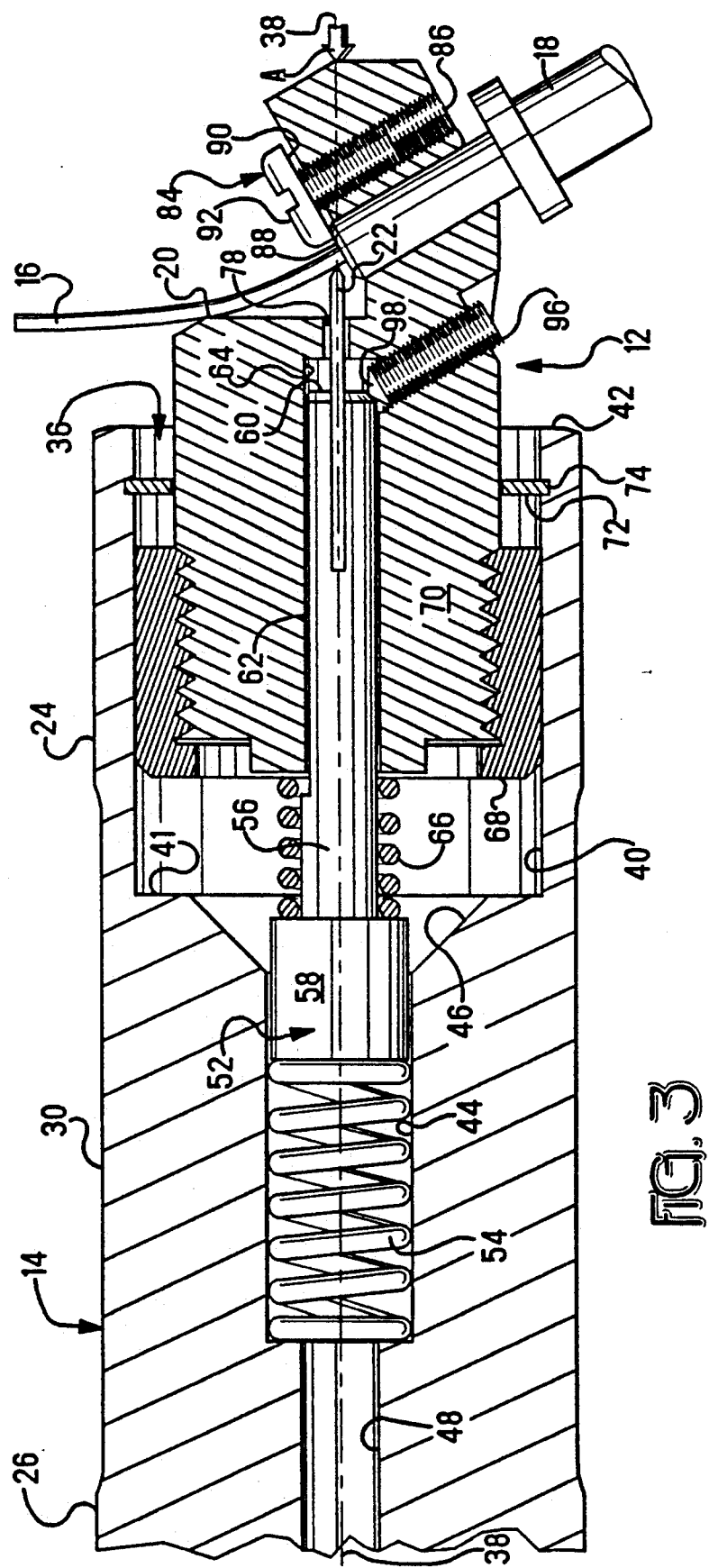
FIG. 3 is a partial cut-away view of the scribe-and-break tool of FIG. 1, shown with the head reorientated and moved inward so that the blade is positioned against the free end of the optical fiber.
Figure 4:
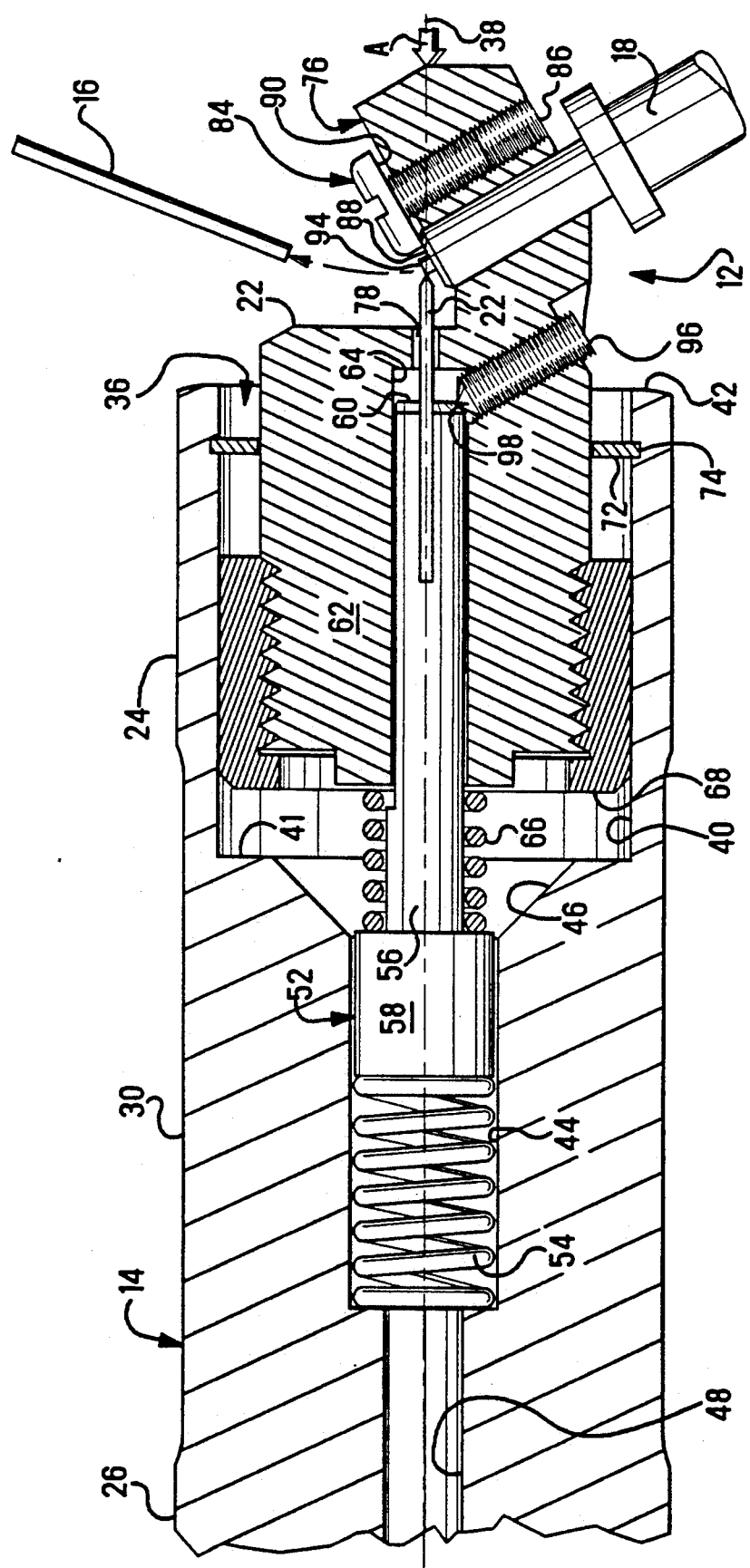
FIG. 4 is a partial cut-away view of the scribe-and-break tool of FIG. 1, shown with the head having moved further inward in conjunction with the plunger.

FIG. 1 shows a hand-holdable scribe-and-break tool 10. The tool 10 has a depressible head 12 extending outward from a body 14. The head 12 supports and positions a free end of an optical fiber 16 that extends from a fiber optic connector ferrule 18 into contact with a shoulder 20 which induces a tensile stress therein. When the head 12 is depressed inward, by the exertion of force along Arrow A, the free end of the optical fiber 16 is brought into contact with a blade 22 that scribes the free end of the optical fiber 16 which results in fracturing and breaking of the fiber (FIG. 3). If the head 12 is depressed further, the blade 22 and the head 12 will move in conjunction with each other (FIG. 4).

As seen in FIG. 1, the outer periphery of the body 14 is configured to be hand-holdable and includes a front section 24 and a rear section 26 each of which have corresponding hexagonal cross-sections that define six flats 28 along the body 14. The flats 28 stabilize the tool 10, when it is set down, and facilitate clamping the tool to a surface (not shown) by a C-clamp, locking pliers, or another similar device. The flats 28 also prevent the tool 10 from rolling if the tool 10 is placed on an inclined surface. Other cross-sections, such as other polygons, a chorded circle, or an elliptical shape, may be similarly useful.

The front section 24 and the rear section 26 are separated by a relieved center section 30 that is knurled to improve gripping. A lanyard 32, that passes through a cross-hole 34 in the rear section 26 of the body 14, allows the tool 10 to be fastened to another object (not shown). Alternatively, the outer periphery of the tool 10 could be modified to provide for at least semi-permanent mounting of the tool 10 at a workstation by including means for attaching the body 14 to the workstation, such as a flange.

The body 14 has an interior cavity 36 (FIGS. 2-4) that extends along a principle axis 38. The interior cavity 36 has a front bore 40 that extends from a front face 42 of the body 14 inward to a plunger bore 44. A clearance chamfer 46 is placed where the front bore 40 meets the plunger bore 44. This chamfer 46 makes assembly of the tool easier. An access passage 48 extends from the plunger bore 44 through a rear face 50 of the body 14. The front bore 40, the plunger bore 44 and the access passage 48 are cylindrically shaped, but may assume other shapes as described below.

The blade 22 that scribes the free end of the optical fiber 16 is interrelated to a plunger 52 located within the interior cavity 36. The blade 22 may be made of natural or synthesized diamond, sapphire, carbide or any other material that can repeatably scribe optical fiber. The blade 22 is biased away from the body 14 by a first resilient member 54 within the plunger bore 44. The first resilient member 54 is a coil spring that acts between the body 14 and the plunger 52 to limit the force exerted by the blade 22 by the free end of the optical fiber 16 during scribing.

The plunger 52 has a stem 56 extending from a plunger cap 58. The plunger cap 58 is cylindrical in shape, which corresponds to the plunger bore 44 and is closely received therein, whereby the plunger 52 may move both reciprocally and rotationally relative the body 14. Opposite the plunger cap 58, the stem 56 has a blade end 60 where the blade 22 is mounted. The stem 56 has a portion 62 at the blade end 60 that has a D-shaped cross section and is slidably engaged within a complementarily shaped channel 64 within the head 12. The D-shape restricts rotational movement of the plunger 52 relative to the head and allows only reciprocal movement therebetween. The portion 62 may take other forms that would allow this same type of motion, such as polygonal cross-sections or more conventional key and keyway combinations.

Figure 2:
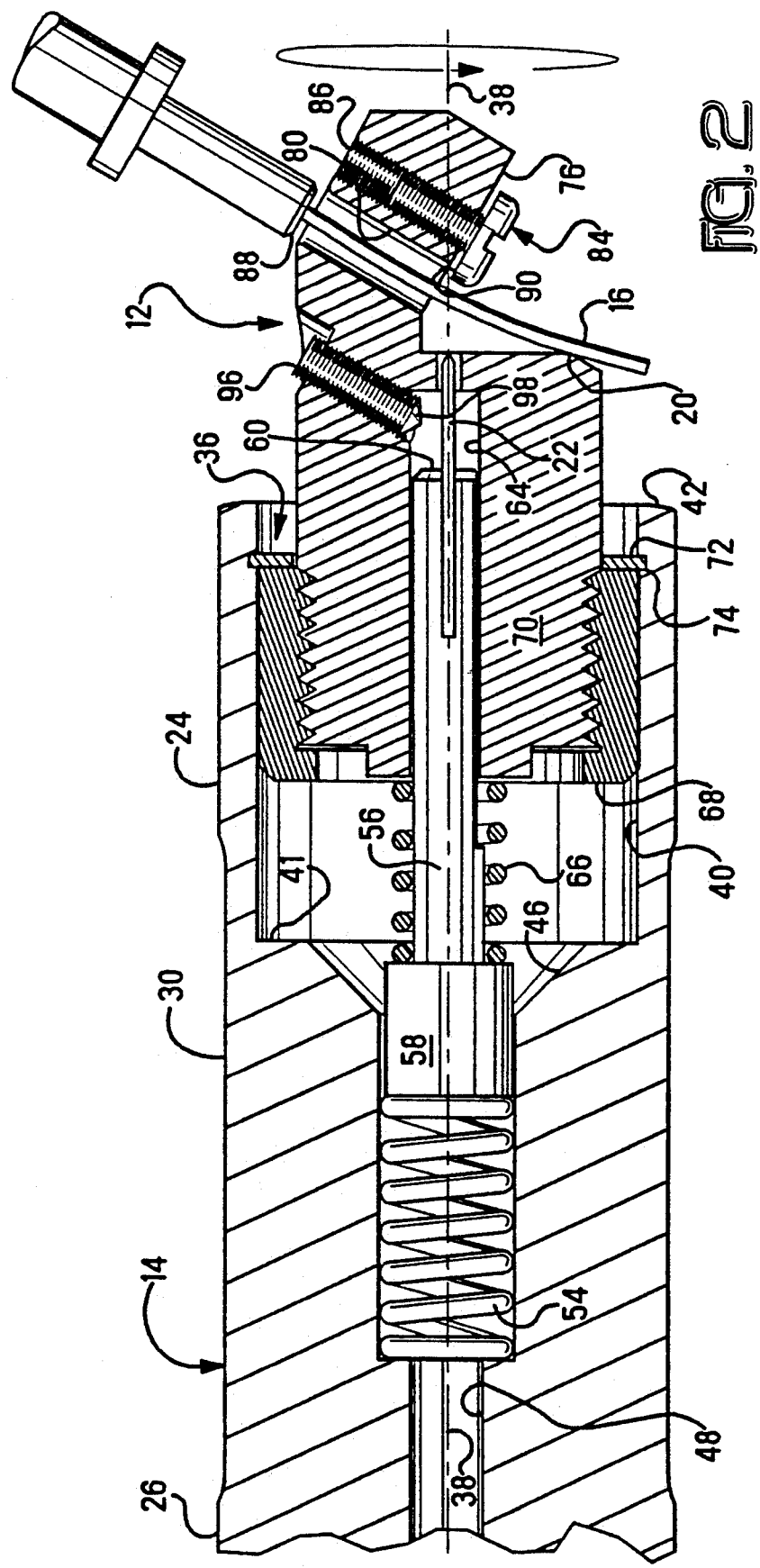
FIG. 2 is a partial cut-away view of the scribe-and-break tool of FIG. 1, illustrating the head in an inactivated position biased outward and orientated to receive the free end of an optical fiber.

A second resilient member 66, shown in the drawings as another coil spring, is received about the stem 56. The second resilient member 66 acts between the plunger cap 58 and the depressible head 12 to bias the depressible head 12 outwardly from the body 14, thereby protecting the blade 22 within the channel 64 when the tool 10 is not being used (FIG. 2). The second resilient member 66 has a spring force that is less than, or equal to, the first resilient member 54 so that the head 12 may be depressed to bring the free end of the optical fiber 16 into contact with the blade 22 (FIG. 3). This configuration suspends the plunger 52 in a cushioned manner between the depressible head 12 and the body 14 by two oppositely acting resilient members, thereby protecting the workings of the tool 10 from shocks caused by mishandling. The plunger 52 is prevented from rattling within the body 14 by the oppositely directed spring forces imposed thereupon by the resilient members 54, 66. The second resilient member 66 could also be positioned between the body 14 and the depressible head 12 to bias the head outward of the body 14.

The depressible head 12 has a piston portion 68 threaded to a positioning portion 70. The depressible head 12 may also be unitarily constructed or utilize features other than threads to connect the two portions 68, 70. Within the positioning portion 70, the complementarily shaped passage 64 extends along the principle axis 38. The piston portion 68 is configured for a close sliding fit within the front bore 40 and is kept there by a retention ring 72, such as a snap-ring, that is disposed within a ring groove 74 along the front bore 40.

Where the piston portion 68 and the front bore 40 are both cylindrical, the depressible head 12 may rotate relative the body 14 about the principle axis 38, as indicated by Arrow B in FIG. 2. This allows the depressible head 12 to be conveniently oriented during use without having to also rotate the body 14, thereby minimizing the chances of mishandling the tool 10. The orientation of the blade 22 is maintained during rotation of the depressible head 12 because the D-shaped portion 62 is within the complementary channel 64. The depressible head 12 may also be keyed to the body 14, through any of the methods described above, so that only reciprocal movement may occur. Such keying may be useful for embodiments that are mounted at a workstation.

The positioning portion 70 has a relieved seat 76 outward the body 14. A blade port 78 extends between the relieved seat 76 and the complementary channel 64 to provide the blade 22 access to the free end of the optical fiber 16. The relieved seat 76 has a positioning bore 80 sized slightly smaller than the ferrule 18 and a slot 81 (FIG. 1) that extends into the positioning bore 80. The positioning bore 80 and the slot 81 are constructed so that the ferrule 18 may be slid into the positioning bore 80 and be retained therein with the free end of the optical fiber 16 generally transverse the principle axis 38. The slot 81 allows for the positioning portion 70 to act as a spring to grip the ferrule when it is placed within the positioning bore 80. It would also be possible to size the positioning bore 80 to receive optical fiber without a ferrule 18.

Once within the positioning bore 80, the free end of the optical fiber 16 extends therefrom and abuts the shoulder 20 of the depressible head 12, thereby inducing the tensile stress. A stop may be used as the shoulder 20 and that stop may be adjustable to vary the tensile stress. The stop may be incorporated into the body 14, whereby the tensile stress would increase as the head 12 moves towards the body 14. The user might also bend the free end of the optical fiber 16 after scribing to induce the tensile stress and break the free end of the optical fiber 16.

A stop screw 84 extends from a threaded hole 86 that is generally parallel to, and offset from, the positioning bore 80. A front face 88 of the ferrule 18 abuts the underside 90 of a head 92 of the stop screw 84 (FIGS. 3 and 4). This provides positive and adjustable positioning of the ferrule 18 so that the free end of the optical fiber 16 will be scribed at a precise location relative the ferrule 18 to leave a small stub 94 extending from the ferrule 18 after breaking (FIG. 4). The length of the stub 94 is set so that any "roll-off" (a defect along the length of the fiber as a result of the breaking of the fiber) will be eliminated during the subsequent polishing operation. If the stub 94 is too long it will also break-off during polishing producing another "roll-off" defect that might extend into the ferrule 18 preventing an imperfection free surface from being produced.

The depressible head 12 also includes an engagement screw 96 that extends into the channel 64. The engagement screw 96 is adjustable and has a conical contact tip 98 that engages the stem 56 as the depressible head 12 is moved inward by the external force along Arrow A. By adjusting the engagement screw 96 the depth of the scribe on the free end of the optical fiber 16 may be varied. The depth which the blade 22 scribes the free end of the optical fiber 16 is initially set by viewing the blade under a microscope and adjusting the engagement screw 96 as desired.

Any further inward movement of the depressible head 12 occurs in conjunction with a corresponding inward movement of the plunger 52 and the blade 22, as the contact tip 98 is in contact with the plunger 52 (FIG. 4). If inward movement of the head is continued the depressible head 12 bottoms against the base 41 of the front bore 40 prior to the plunger 52 bottoming within the plunger bore 44, this assures that the plunger 52 and the blade 22 are protected by the resiliency of the first resilient member 54 and that any forces exerted on the contact tip 98 are limited, thereby protecting the settings established for the depth of the scribe.

In operation, an optical fiber is captivated in the ferrule 18 so that the free end of the optical fiber 16 extends from the front face 88 of the fiber optic connector ferrule 18. As best seen in FIG. 2, the depressible head 12 may be oriented to a convenient position for the user to enable the ferrule 18 to be easily pressed into the positioning bore 80 until stopping against the underside 90 of the stop screw 84. The free end of the optical fiber 16 is now against the shoulder 20 of the depressible head 12 with a tensile stress induced therein. The depressible head 12 may be rotated to a different orientation for breaking the free end of the optical fiber 16, if desired.

A force is exerted on the depressible head 12 along Arrow A, for example by the user's hand or by the user holding the body 14 in their hand and pressing the head 12 against another object, to move the depressible head 12 inward. This inward movement compresses the second resilient member 66 (FIG. 3) and brings the free end of the optical fiber 16 into contact with the blade 22, whereby the free end of the fiber 16 fractures and breaks off (FIG. 4). The contact tip 98 of the engagement screw 96 is now in contact with the plunger stem 56 (FIG. 3). If the force along arrow A is continued the first resilient member 54 will compress and the plunger 52 will move in conjunction with the depressible head 12 until the depressible head 12 bottoms at the base 41 of the front bore 40.

The tool may be constructed of a variety of materials. In the illustrative embodiment, the body 14 is made from aluminum, the depressible head 12 is molded from acetal and the plunger 52 is made of stainless steel. The material selected for the depressible head 12 is selected so that the relieved seat 76 will have the desired amount of resiliency so that the ferrule 18 can be easily inserted and removed from the positioning bore 80 while being held in place after insertion. Other materials may also be useful and these should not be limiting choices.

It should be recognized that the above-described embodiments and forms, constitute the presently preferred form of the invention and that the invention may take numerous other forms, only some of which have been described above. Accordingly, the invention should be only limited by the scope of the following claims.

We claim:

1. A scribe-and-break tool for severing a free end of an optical fiber, comprising:
   a body having a principle axis;
   a plunger mounted to the body and extending along the principle axis, the plunger having an interrelated blade for scribing the free end of the optical fiber; and
   a depressible head extending outward of the body and being movable rotationally about the principle axis and reciprocally along the principle axis between an outward position and an inward position, the head having
      a positioning portion for receiving and supporting the free end of the optical fiber transversely to the principle axis and
      a channel that slidably engages the plunger such that as the head is moved towards the inward position the blade comes in contact with the free end of the optical fiber;
   whereby, the free end of the optical fiber is scribed and a tensile force applied thereto breaks the fiber.

2. The scribe-and-break tool of claim 1, wherein the body is hand holdable.

3. The scribe-and-break tool of claim 1, wherein a portion of the tool has a non-circular cross-section thereupon that prevents the tool from rolling.

4. The scribe-and-break tool of claim 3, wherein the cross-section is polygonal.

5. The scribe-and-break tool of claim 1, wherein the tool has a lanyard affixed thereto.

6. The scribe-and-break tool of claim 1, wherein the plunger and the channel are of complementary shapes such that relative reciprocal motion may occur, while relative rotational motion is prevented.

7. The scribe-and-break tool of claim 1, wherein the body has a flat therealong.

8. The scribe-and-break tool of claim 1, wherein the tool has a shoulder that abuts the free end of the optical fiber when received positioning portion, whereby the free end of the optical fiber has a tensile stress induced therein.

9. The scribe-and-break tool of claim 8, wherein the fiber tensioner deflects the free end of the optical fiber away from the blade.

10. The scribe-and-break tool of claim 9, wherein the fiber tensioner is a shoulder of the head.

11. A scribe-and-break tool for severing a free end of an optical fiber extending from a fiber optic connector ferrule, comprising:
- a body having a principle axis;
- a plunger resiliently mounted to the body by a first resilient member and extending along the principle axis, the plunger having an interrelated blade for scribing the free end of the optical fiber; and
- a depressible head biased outward of the body by a second resilient member, the head being rotatable about the principle axis and reciprocally movable along the principle axis between an outward position and an inward position, the head having
  - a positioning portion for receiving and supporting the free end of the optical fiber transversely to the principle axis;
  - a channel that slidably engages the plunger such that the head moves reciprocally along the plunger towards the inward position the blade contacts the free end of the optical fiber and the plunger engages the depressible head such that any further movement of the depressible head causes the plunger to move in conjunction therewith;

thereby, scribing the free end of the optical fiber and a tensile force applied thereto breaks the fiber.

12. The scribe-and-break tool of claim 11, wherein the force exerted by the first resilient member on the head does not exceed the force exerted by the second resilient member on the plunger.

13. The scribe-and-break tool of claim 11, wherein the head includes a engagement screw in communication with the channel that engages the plunger as the blade contacts the optical fiber as when the head is moved inward, the head and the plunger then moving in conjunction, whereby the blade is prevented from extending into the free end of the optical fiber beyond the desired amount of scribing.

14. The scribe-and-break tool of claim 13, wherein the engagement screw is adjustable.

15. The scribe-and-break tool of claim 11, wherein the positioning portion supports and positions the fiber optic ferrule in a sliding fit, thereby permitting linear and rotational motion of the fiber.

16. The scribe-and-break tool of claim 11, wherein the body has a flat extending therealong, whereby the tool is prevented from rolling.

17. The scribe-and-break tool of claim 11, wherein the body is hand holdable.

18. The scribe-and-break tool of claim 11, wherein a lanyard is connected to the body.

* * * * *